G. C. BERG.
PROCESS OF MAKING COMPOSITE SHIPS' PLATES.
APPLICATION FILED AUG. 6, 1907.

936,514.

Patented Oct. 12, 1909.

WITNESSES:
H. Keating
M. Eastman

INVENTOR,
George C. Berg
BY
F. M. Wright
ATTORNEY.

UNITED STATES PATENT OFFICE.

GEORGE C. BERG, OF SAN FRANCISCO, CALIFORNIA.

PROCESS OF MAKING COMPOSITE SHIPS' PLATES.

936,514.

Specification of Letters Patent. Patented Oct. 12, 1909.

Application filed August 6, 1907. Serial No. 387,369.

*To all whom it may concern:*

Be it known that I, GEORGE C. BERG, a citizen of the United States, residing at San Francisco, in the county of San Francisco and State of California, have invented new and useful Improvements in Processes of Making Composite Ships' Plates, of which the following is a specification.

The object of the present invention is to provide a process of making a compound ship's plate having a steel body portion and a copper coating or outer portion intimately united to the steel, so as to form practically a single piece.

Figure 1:
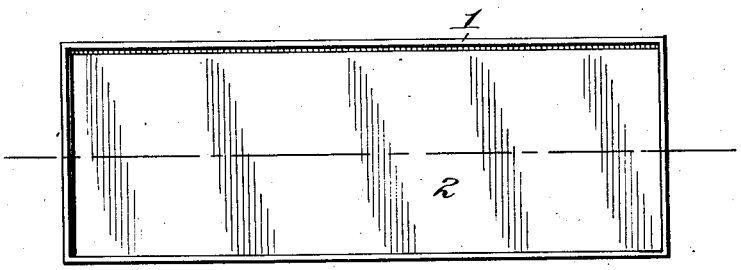
Figure 2:
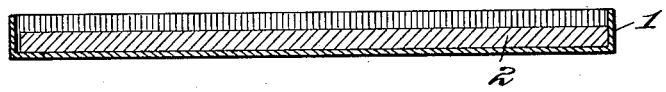
Figure 3:
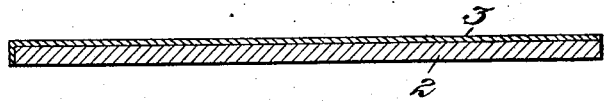

In the accompanying drawing, Figure 1 is a plan view of an apparatus used for carrying out said process; Fig. 2 is a vertical section of the same; Fig. 3 is a vertical section of the plate formed by my improved process.

Referring to the drawing, 1 indicates a suitable mold, in which is placed the steel plate 2. If it is desired to cover with copper not only the upper surface of the steel plate, but the edge or edges thereof, the mold is made of suitable size, so that the edges of the plate are spaced from the walls of the mold. But if it is desired to cover only the upper surface of the steel plate, then the mold is made of such size as to closely fit around the edges of the plate. The mold, with the plate therein, is now adjusted so that the upper surface of the steel plate is accurately level, by the copper, when united thereto by the process hereinafter described, shall be of uniform thickness. The steel plate having been thus leveled is now covered with fluxing material, such as powdered borax, the purpose of which is to prevent oxidation or scaling of the steel plate, which would otherwise occur at 800° F. for, if this scaling takes place, the welding of the steel and copper cannot be perfectly effected. A copper alloy is now used, consisting of about 2% of aluminum or zinc with pure copper. This alloy in sheets or in pieces is spread over the surface and edges if desired of the steel plate. The alloy is preferably used instead of the pure copper because it flows more readily when in a molten state and thus avoids the formation of small cavities. However, pure copper may also be used. The plate is now heated, preferably by passing an electric current of low voltage and of amperage adequate for the purpose through the adjoining surfaces of steel and copper, although a common hearth can be used, until the compound plate attains a temperature a little above the melting point of copper. The plate is permitted to remain at this temperature for about fifteen seconds, and the process of welding takes effect during that time. During this process, the surface of the steel next to the copper becomes sufficiently soft to permit the molten copper to become intimately united thereto. Immediately after withdrawing the heating current an electric current of high voltage and small quantity should be applied to the plate for about two seconds while the copper is in a molten condition, the effect of which is to eliminate blowholes or bubbles contained in the copper which have not come to the surface. The copper plate 3 may then be rolled smooth if desired while the copper is still in a soft condition. The plate is then cooled in any convenient manner, and the copper surface assumes a dark red color similar to that before welding.

I claim:—

1. The process of making composite ships' plates of steel and copper, which consists in covering the surface of the steel plate with a suitable fluxing material to prevent oxidation when raised to a high temperature, then laying thereover copper of suitable thickness, then passing through the adjoining surfaces of the steel and copper a current of electricity, to generate, by resistance of the materials, heat sufficient to cause the adjoining surfaces of the steel and copper to intimately commingle, and then cooling the composite plate so formed, substantially as described.

2. The process of making composite ships' plates of steel and copper, which consists in covering the surface of the steel plate with a suitable fluxing material to prevent oxidation when raised to a high temperature, then laying thereover copper of suitable thickness, then passing through the adjoining surfaces of the steel and copper a current of electricity, to generate, by resistance of the materials, heat sufficient to cause the adjoining surfaces of the steel and copper to intimately commingle, then passing through said surfaces an electric current of small quantity and high voltage, substantially as described.

3. The process of making composite ships' plates of steel and copper, which consists in covering the surface of the steel plate with a suitable fluxing material to prevent oxidation when raised to a high temperature, then laying thereover copper of suitable thickness, then passing through the adjoining surfaces of the steel and copper a current of electricity, to generate, by resistance of the materials, heat sufficient to cause the adjoining surfaces of the steel and copper to intimately commingle, then rolling the outer surface of the copper while still in a soft condition, substantially as described.

4. The process of making composite ships' plates of steel and copper, which consists in covering the surfaces of the steel plate with a suitable fluxing material to prevent oxidation when raised to a high temperature, then laying thereover copper of suitable thickness, then passing through the adjoining surfaces of the steel and copper a current of electricity, to generate, by resistance of the materials, heat sufficient to cause the adjoining surfaces of the steel and copper to intimately commingle, then passing through said surfaces an electric current of small quantity and high voltage, then rolling the outer surface of the copper while still in soft condition, substantially as described.

5. The process of making composite ships' plates, which consists in covering the surface of the steel plate with a suitable fluxing material to prevent oxidation when raised to a high temperature, then laying thereover an alloy of copper with a small percentage of a more electropositive metal, then passing through the adjoining surfaces of the steel and alloy a current of electricity, to generate, by resistance of the materials, heat sufficient to cause the adjoining surfaces of the steel and copper to intimately commingle, and then rolling the outer surface of the alloy while still in a soft condition, substantially as described.

In testimony whereof I have hereunto set my hand in the presence of two subscribing witnesses.

GEORGE C. BERG.

Witnesses:
FRANCIS M. WRIGHT,
D. B. RICHARDS.